(12) United States Patent
El Hamss et al.

(10) Patent No.: US 12,185,314 B2
(45) Date of Patent: Dec. 31, 2024

(54) METHODS AND APPARATUS FOR DYNAMIC SPECTRUM SHARING

(71) Applicant: InterDigital Patent Holdings, Inc., Wilmington, DE (US)

(72) Inventors: Aata El Hamss, Laval (CA); Paul Marinier, Brossard (CA); Faris Alfarhan, Montreal (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/677,257

(22) Filed: May 29, 2024

(65) Prior Publication Data

US 2024/0314784 A1    Sep. 19, 2024

Related U.S. Application Data

(63) Continuation of application No. 18/645,998, filed on Apr. 25, 2024, which is a continuation of application
(Continued)

(51) Int. Cl.
*H04W 72/1273*    (2023.01)

(52) U.S. Cl.
CPC ............................. *H04W 72/1273* (2013.01)

(58) Field of Classification Search
CPC .................................................. H04W 72/1273
See application file for complete search history.

(56) References Cited

U.S. PATENT DOCUMENTS 10,805,872  B2    10/2020  Yi et al.
2017/0013565 A1    1/2017  Pelletier et al.
(Continued)

FOREIGN PATENT DOCUMENTS

| JP | 2017-507583 A | 3/2017 |
|---|---|---|
| JP | 2020-523959 A | 8/2020 |
| KR | 20200105406 A | 9/2020 |
| WO | 2020029945 A1 | 2/2020 |
| WO | 2021086084 A1 | 5/2021 |

OTHER PUBLICATIONS 38.213 V16.2.0 2020-06 TS 38.213 , "Physical layer procedures for control TS", GPP Technical Specification Group Radio Access Network, Clause 9.1.3.1, Jun. 2020, 176 pages.
(Continued)

*Primary Examiner* — Kevin M Cunningham
(74) *Attorney, Agent, or Firm* — Flaster Greenberg, P.C.

(57) ABSTRACT

A wireless transmit receive unit (WTRU) may be configured to monitor physical downlink control channel (PDCCH) candidates of a primary cell (PCell) and a secondary cell (SCell). The WTRU may be configured to determine a time duration for PDCCH candidate budgets for a set of symbols based on a subcarrier spacing associated with the PCell and a subcarrier spacing associated with the SCell. The WTRU may be configured to determine a maximum number of PDCCH candidates to allocate to a search space monitoring occasion of the PCell and the SCell. The maximum number of PDCCH candidates may be based on a per-cell ratio. The WTRU may be configured to allocate PDCCH candidates for the search space monitoring occasion of the PCell and the search space monitoring occasion of the SCell based on the determined maximum number of PDCCH candidates. The WTRU may be configured to decode an allocated PDCCH candidate.

14 Claims, 13 Drawing Sheets

Related U.S. Application Data

No. 18/019,288, filed as application No. PCT/US2021/044709 on Aug. 5, 2021.

(60) Provisional application No. 63/185,878, filed on May 7, 2021, provisional application No. 63/168,080, filed on Mar. 30, 2021, provisional application No. 63/061,611, filed on Aug. 5, 2020.

(56) References Cited

U.S. PATENT DOCUMENTS

| | | | |
|---|---|---|---|
| 2020/0120584 A1 | 4/2020 | Yi et al. | |
| 2021/0084620 A1 | 3/2021 | Tooher et al. | |
| 2021/0168774 A1* | 6/2021 | Li | H04W 16/14 |
| 2021/0274535 A1* | 9/2021 | Yi | H04W 24/08 |
| 2021/0282001 A1* | 9/2021 | Saber | H04W 72/23 |

OTHER PUBLICATIONS

R1-1714095 , "On NR CA/DC Configuration and Cross-numerology Scheduling", Nokia, Nokia Shanghai Bell, Jun. 21-25, 2017, 5 pages.

R1-1813933 , "Offline summary for PDCCH structure and search space", Internet-Based Electronic Resources NTT DOCOMO, Nov. 12-16, 2018, 94 pages.

R1-1901188 , "On UE Adaptation to the Traffic", Nokia, Nokia Shanghai Bell, Jan. 21-25, 2018, 13 pages.

R1-2002722 , "Summary#2 on maintenance of wide-band operation for NR-U", 3GPP TSG RAN WG1, #100bis e-Meeting, Discussion and decision, Apr. 20-30, 2020, 39 Pages.

RP-191052 , "Dynamic spectrum sharing in Rel-17 Ericsson", 3GPP TSG RAN Meeting #84 Newport Beach, CA, USA, Jun. 3-6, 2019, 6 pages.

RP-192678 , "New WID on NR Dynamic spectrum sharing (DSS)", Ericsson 3GPP TSG RAN Meeting #86 Sitges, Spain, Dec. 9-12, 2019, 3 pages.

KR 2020/0105406 A, Cited in International Search Report dated Nov. 4, 2021, in related PCT Application No. PCT/US2021/044709. *English translation of Description and Claims previously provided by Espacenet.com.

WO 2021/086084 A1, Cited in International Search Report dated Nov. 4, 2021, in related PCT Application No. PCT/US2021/044709. *English translation of Description and Claims previously provided by Espacenet.com.

WO 2020/029945 A1, Cited in First Office Action dated May 16, 2022, in related Taiwan Application No. 110128872. *English translation of Description and Claims previously provided by Espacenet.com.

* cited by examiner

METHODS AND APPARATUS FOR DYNAMIC SPECTRUM SHARING

CROSS-REFERENCE TO RELATED APPLICATIONS

This application is a continuation of U.S. Non-Provisional application Ser. No. 18/645,998, filed Apr. 25, 2024, which is a continuation of U.S. Non-Provisional Application No. 18/019,288 filed Feb. 2, 2023, which is the 371 National Stage of International Application No. PCT/US2021/044709, filed Aug. 5, 2021, which claims the benefit of U.S. Provisional Application No. 63/061,611, filed Aug. 5, 2020, U.S. Provisional Application No. 63/168,080, filed Mar. 30, 2021, and U.S. Provisional Application No. 63/185,878, filed May 7, 2021, the contents of which are incorporated herein by reference.

BACKGROUND

New Radio (NR) technology was specified by 3GPP and was designed to provide high flexibility for both control channels and data channels. For control channels, NR supports different monitoring patterns as well as different physical downlink control channel (PDCCH) locations within a slot. For data channels, NR supports variable transmission duration, starting symbol within a slot, and flexible hybrid automatic repeat request (HARQ)-ACK feedback timing. A carrier may support wireless transmit receive units (WTRUs) with different bandwidth capabilities, e.g. narrow band devices as well as broad band devices using a concept of bandwidth parts. In addition, different carrier spacing may be used on the same carrier simultaneously. For example, a large bandwidth part may be configured with a large subcarrier spacing (SCS) while a small bandwidth part be configured with a smaller SCS allowing different WTRUs with different capabilities to coexist on the same spectrum.

In NR, it has been proposed to share spectrum with Long Term Evolution (LTE). Sharing spectrum with LTE requires semi-statically reserving physical resources at least for an LTE control region. This may reduce a NR primary cell (PCell) capacity to transmit downlink control signaling and also may reduce the available resources for data within a slot since the data region should be preceded by a control region. Supporting NR secondary cell (SCell) scheduling for a NR PCell will create a reliability issue of downlink control information. Also, with support of control channels on SCell scheduling data on a PCell, a WTRU may not be capable of receiving or monitoring control channels on both cells simultaneously due to an increasing blind decoding effort. Accordingly, there is a need for methods for NR to share spectrum efficiently with LTE.

SUMMARY

A wireless transmit receive unit (WTRU) may be configured to monitor physical downlink control channel (PDCCH) candidates of a primary cell (PCell) and a secondary cell (SCell). The WTRU may be configured to determine a time duration for PDCCH candidate budgets for a set of symbols based on a subcarrier spacing associated with the PCell and a subcarrier spacing associated with the SCell. The WTRU may be configured to determine a maximum number of PDCCH candidates to allocate to a search space monitoring occasion of the PCell and a search space monitoring occasion of the SCell. The maximum number of PDCCH candidates may be based on a per-cell ratio. The WTRU may be configured to allocate PDCCH candidates for the search space monitoring occasion of the PCell and the search space monitoring occasion of the SCell based on the determined maximum number of PDCCH candidates. The WTRU may be configured to decode an allocated PDCCH candidate.

The WTRU may be configured to determine whether there are PCell and SCell search space monitoring occasions that overlap during the set of symbols, and to determine the maximum number of PDCCH candidates to allocate on a condition that there are overlapping search space monitoring occasions. The per-cell ratio may be determined based on a number of configured PDCCH candidates on the PCell (N1) and a number of configured downlink control channel candidates on the SCell (N2). The maximum number of PDCCH candidates for the PCell may be based on the number of configured PDCCH candidates for the PCell (N1) as a fraction of a total number of configured PDCCH candidates for the PCell and the SCell (N1+N2). The maximum number of PDCCH candidates for the SCell may be based on the number of configured PDCCH candidates for the SCell (N2) as a fraction of a total number of configured PDCCH candidates for the PCell and the SCell (N1+N2). The WTRU may be configured to prioritize a search space to monitor based on a search space priority or a search space index.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
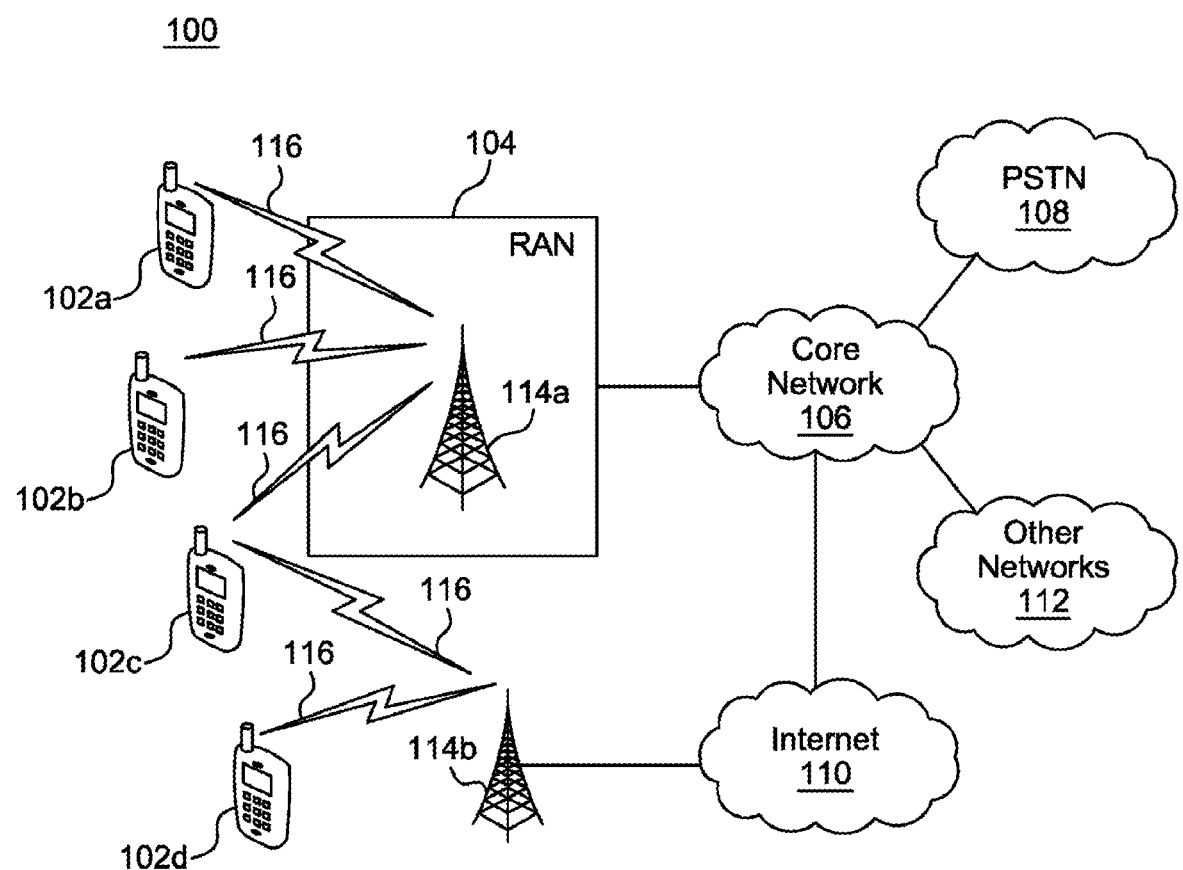
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
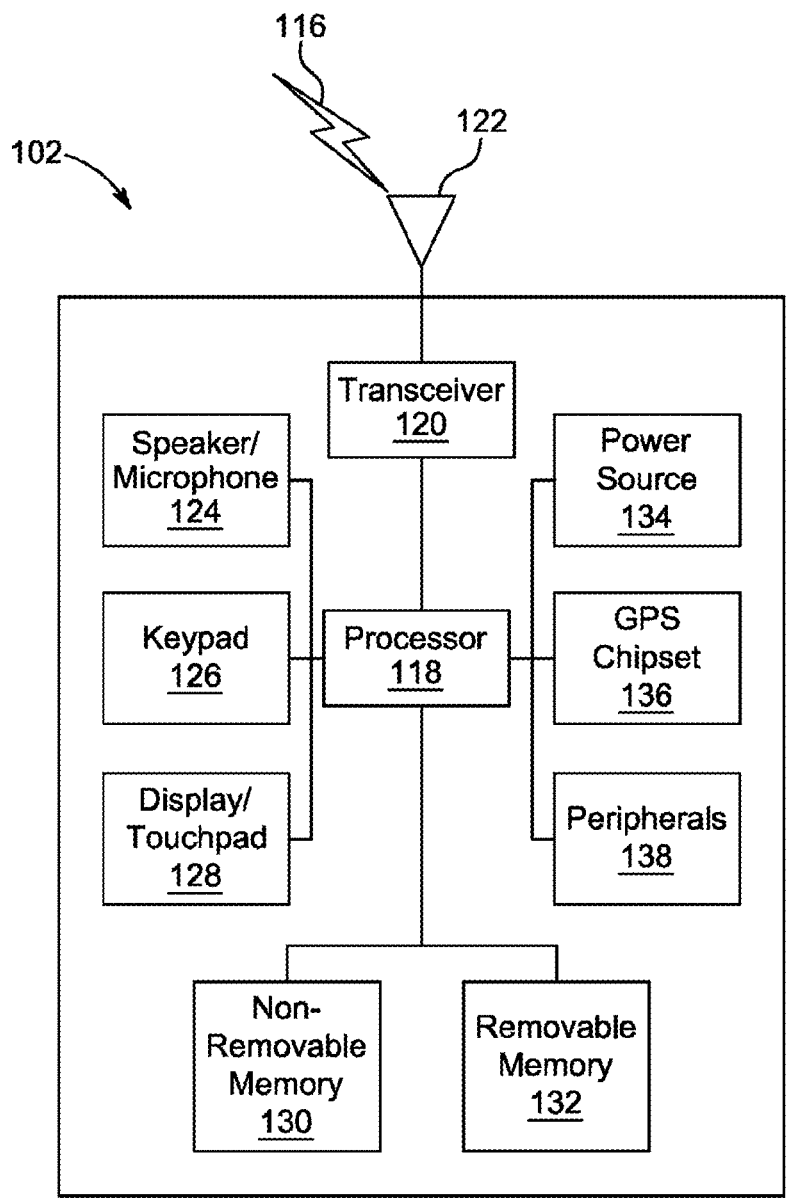
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
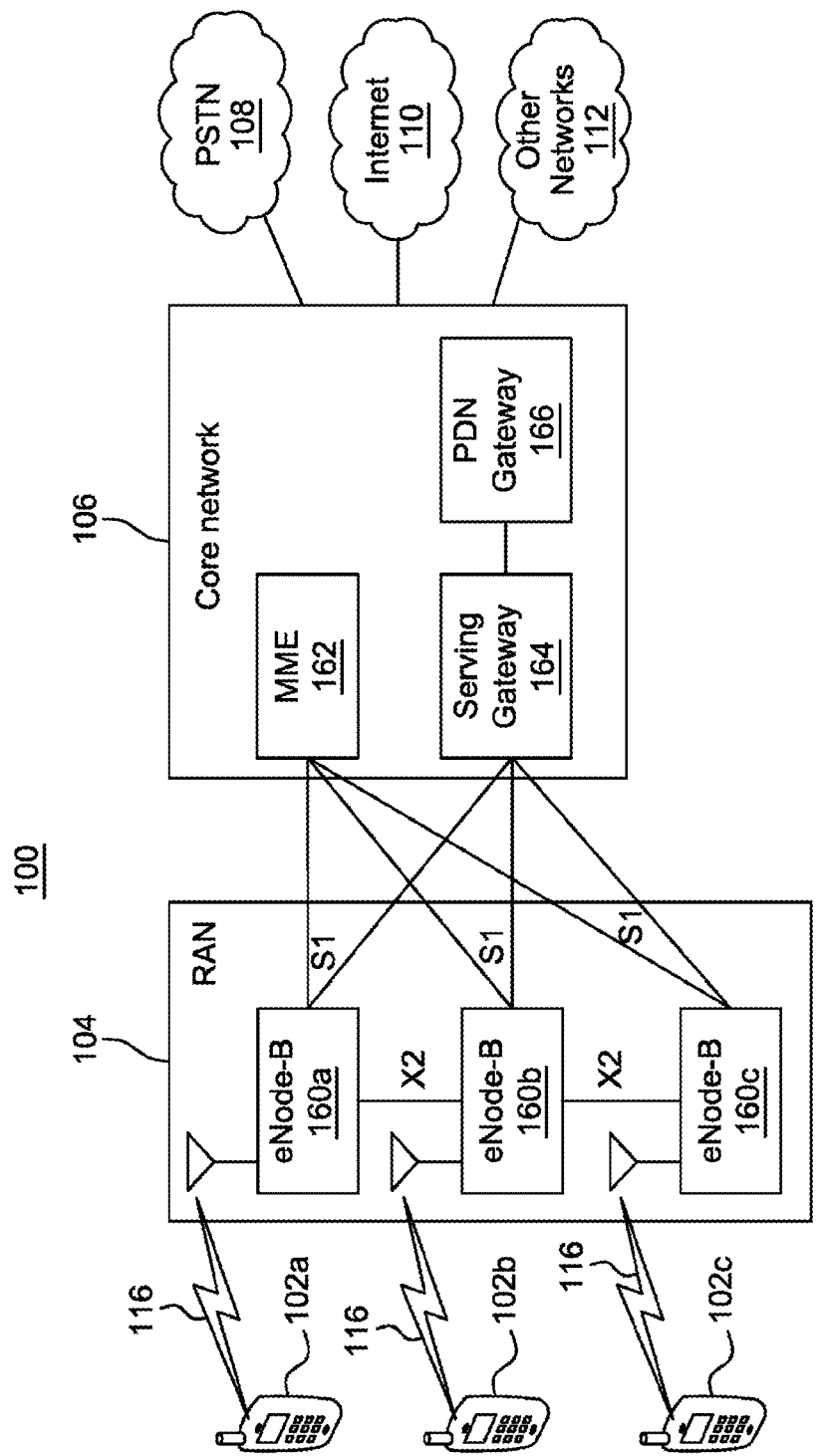
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHZ. The total bandwidth available for 802.11ah is 6 MHz to 26 MHz depending on the country code.

Figure 1D:
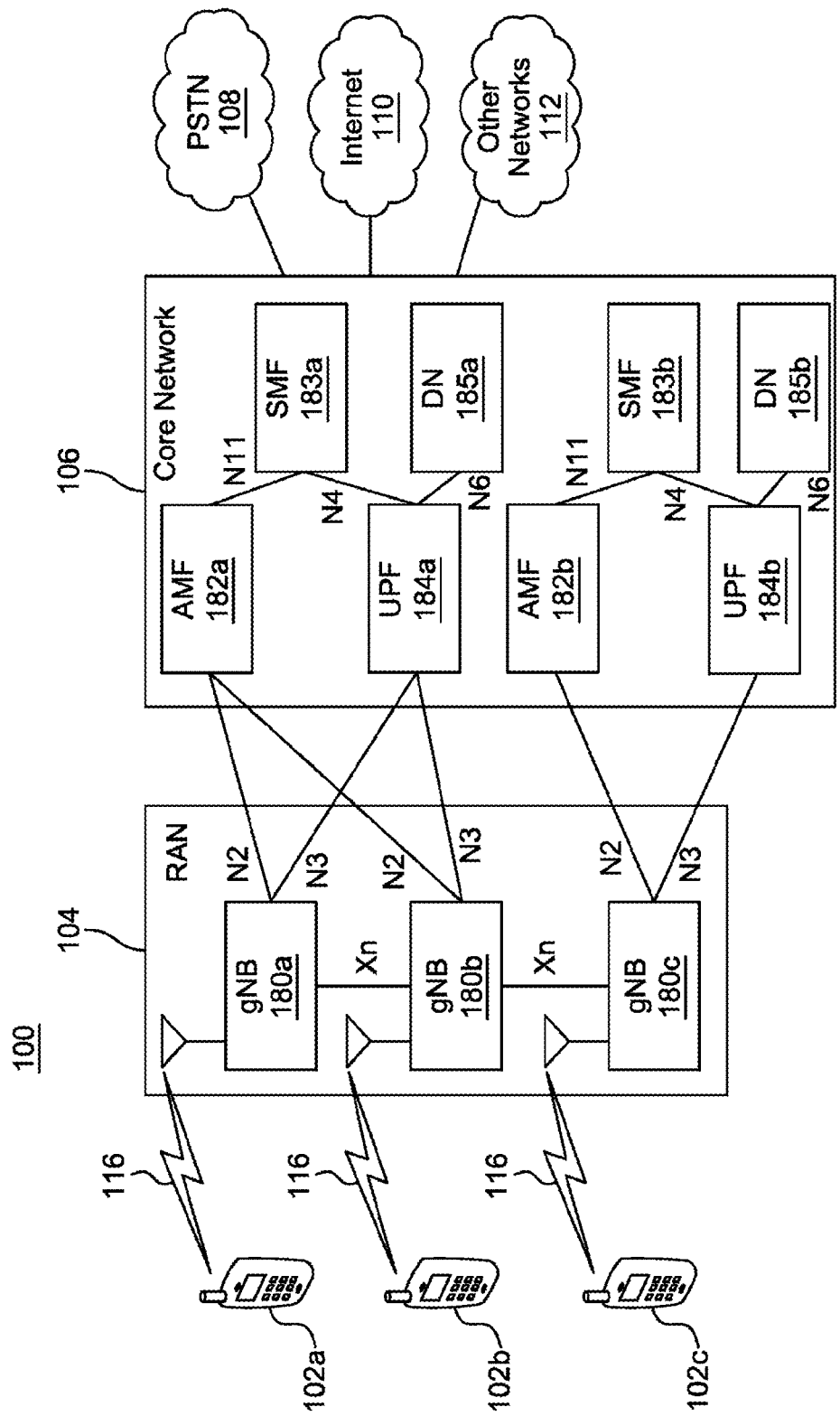
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations and acronyms may be referred to:

CG Configured grant or cell group
DG Dynamic grant
CAPC Channel access priority class
DFI Downlink feedback information
HARQ PID HARQ Process ID
eLAA enhanced Licensed Assisted Access
FeLAA Further enhanced Licensed Assisted Access
MAC CE MAC control element
ACK Acknowledgement
BLER Block Error Rate
BWP Bandwidth Part
CAP Channel Access Priority
CCA Clear Channel Assessment
CP Cyclic Prefix
CP-OFDM Conventional OFDM (relying on cyclic prefix)
CQI Channel Quality Indicator
CRC Cyclic Redundancy Check
CSI Channel State Information
CW Contention Window
CWS Contention Window Size
CO Channel Occupancy
DAI Downlink Assignment Index
DCI Downlink Control Information
DL Downlink
DM-RS Demodulation Reference Signal
DRB Data Radio Bearer
HARQ Hybrid Automatic Repeat Request
LAA License Assisted Access
LBT Listen-Before-Talk
LTE Long Term Evolution e.g. from 3GPP LTE R8 and up
NACK Negative ACK
MCS Modulation and Coding Scheme
MIMO Multiple Input Multiple Output
NR New Radio
OFDM Orthogonal Frequency-Division Multiplexing
PHY Physical Layer
PRACH Physical Random Access Channel
PSS Primary Synchronization Signal
RACH Random Access Channel (or procedure)
RAR Random Access Response
RCU Radio access network Central Unit
RF Radio Front end
RLF Radio Link Failure
RLM Radio Link Monitoring
RNTI Radio Network Identifier
RRC Radio Resource Control
RRM Radio Resource Management
RS Reference Signal
RSRP Reference Signal Received Power
RSSI Received Signal Strength Indicator
SDU Service Data Unit
SRS Sounding Reference Signal
SS Synchronization Signal
SSS Secondary Synchronization Signal
SWG Switching Gap (in a self-contained subframe)
SPS Semi-persistent scheduling
SUL Supplemental Uplink
TB Transport Block
TBS Transport Block Size
TRP Transmission/Reception Point
TSC Time-sensitive communications
TSN Time-sensitive networking
UL Uplink
URLLC Ultra-Reliable and Low Latency Communications
WBWP Wide Bandwidth Part
WLAN Wireless Local Area Networks and related technologies (IEEE 802.xx domain)

New Radio (NR) is designed to provide high data rates, very low latency, and several new features as compared to LTE. To enable smooth migration from LTE to NR, spectrum sharing may be used to allow both of these radio access technologies (RATs) to share the same frequency resources. The spectrum sharing feature was designed for early deployments of NR that were expecting a higher number of LTE WTRUs compared to NR WTRUs. After the first deployments of NR, it is expected that the number of NR WTRUs may exceed the number of LTE WTRUs, which motivates a need to redesign and enhance the spectrum sharing feature to enable a more efficient way to share the spectrum between the networks of the two RATs.

A common deployment for NR is to have an LTE cell and a NR primary cell (PCell) sharing the same spectrum in a lower frequency region and to provide NR WTRUs with a secondary Cell (SCell) operating in a high frequency region so that a high data rate may be achieved.

A WTRU may be configured with control channels on both a PCell and an SCell that can schedule data within a PCell. Embodiments are presented herein on how a WTRU may monitor control channels across different cells to schedule data within a PCell. A focus is on scheduling data on a PCell, but the embodiments presented herein may be applied for other scenarios such as control channels on an SCell and a PCell scheduling data on an SCell as well as control channels on different SCells scheduling data on an SCell.

A scheduled cell may be a cell on which a physical downlink shared channel (PDSCH) may be received and/or a physical uplink shared channel (PUSCH) may be transmitted. For example, a PCell may be a scheduled cell. A scheduling cell may be a cell that can schedule a scheduled cell. For example, an SCell may schedule a PCell. In another example, a scheduled PCell may schedule itself making the PCell a scheduling cell.

In an embodiment, a WTRU may be semi-statically configured with a search space set in both a PCell and an SCell for scheduling data on the PCell. Some search spaces may only be present on a PCell, for example, a common search space. To avoid an increase in blind decoding effort while enabling dynamic load balancing, it is proposed to have dynamic signaling to switch or turn off some search spaces. A WTRU may dynamically determine which search space set and/or control channel resources to monitor. The determination on which search space set and/or control channel resources to monitor may be based on, for example: WTRU specific signaling; WTRU common signaling; monitoring pattern and scheduling activity (e.g., a WTRU may monitor control channels on a PCell only on some duration and if it is scheduled by the PCell, the duration may be extended); cell activation/deactivation; DRX cycle; and active BWP.

In an embodiment, a WTRU may be configured to monitor all the search spaces in an SCell for scheduling a PCell. This may result in WTRU reachability issues. For example, if radio conditions deteriorate on the SCell, the WTRU may not be reached even if the PCell radio link is good.

In an embodiment, a WTRU may trigger a monitoring of a configured search space on a PCell which may be considered a fallback mechanism. For example, a WTRU may have a common search space to monitor system information and other common signaling in a PCell, but this search space may not be suitable to schedule all WTRUs (blocking probability issue). In this embodiment, a WTRU may autonomously activate or start monitoring a search space. The WTRU may autonomously activate or start monitoring a search space after, for example, measurements, an absence of a DCI for a configured period of time, or for a number (e.g. >=1) of PDCCH occasions in a configured period.

In an embodiment, a WTRU may perform radio link monitoring on an SCell. If the link quality is bad, the WTRU may switch to monitor control channels on a PCell and indicate or send an indication of the switching to a network entity, for example, a gNB. The indication may be, for example: a transmission on a particular or any PRACH resource, initiation of a RACH procedure; an SR transmission; a special resource for a switching indication; an SRS transmission; or a triggering or inclusion of a MAC CE to indicate the SCell RLM condition of the SCell. The MAC CE may be restricted for transmission on the PCell.

Scheduling information may be an uplink grant or a downlink assignment. A property of scheduling information may be, for example: a frequency allocation; an aspect of time allocation, such as a duration; a priority; a modulation and coding scheme; a transport block size; a number of spatial layers; a number of transport blocks to be carried; a TCI state, an SRI; a number of repetitions; whether the grant is a configured grant type 1, type 2 or a dynamic grant; whether the repetition scheme is type A or type B; a configured grant index or a semi-persistent assignment index; a periodicity of a configured grant or assignment; a channel access priority class (CAPC); or any parameter provided in a DCI, by MAC or by RRC, for the scheduling grant or assignment.

A property of data included in a transport block (TB) may refer to any parameter configuring a logical channel or radio bearer for which data may be included in the TB. For example, at least one of a logical channel priority, prioritized bit rate, logical channel group, or RLC mode.

A property of a grant or assignment may refer to a property of the data included in a corresponding TB. An indication by a DCI may comprise an explicit indication. The explicit indication may be, for example, by a DCI field or by an RNTI used to mask a CRC of a PDCCH. An indication by a DCI may comprise an implicit indication. The implicit indication may be by, for example, a property such as a DCI format, a DCI size, a CORESET or search space, an aggregation level, or an identity of a first control channel resource (e.g., index of first CCE) for a DCI. A mapping between the property and the value may be signaled by, for example, RRC or MAC.

In an embodiment, a WTRU may be configured with a control resource set (CORESET) and/or a search space set that may be defined across cells (i.e. a search space set and/or CORESET may have resources in both a PCell and an SCell). In an example, a CORESET may have interleaved resources with a first set of frequency resources within a PCell and a second set of frequency resources within an SCell. In an example, a search space may be configured within a CORESET that may have physical resources in both the PCell and the SCell. In an example, a search space set may be configured to have resources on two CORESETs in a different cell (e.g. one CORESET on a PCell and another CORESET on an SCell). For example, a search space set configuration may include a parameter that indicates the list of CORESET(s) to which the search space set belongs.

A search space configuration on a scheduling cell may include a parameter that indicates the target scheduled cell or cells. For example, RRC configuration of a search space may include a target cell ID as part of search space configuration. A set of search space indices of a scheduling cell may be reserved or dedicated to schedule on a scheduled cell. For example, a search space with ID=0 in an SCell (or with an ID within a certain range or certain value) may be reserved for scheduling on a PCell.

In an embodiment, a WTRU may use a control channel selection procedure. The control channel selection procedure may be used to determine a serving cell, a bandwidth part (BWP), a search space, and/or a CORESET on which a PDCCH is monitored for reception of downlink control and/or scheduling information corresponding to a particular cell (e.g. the PCell). Upon activation of PDCCH monitoring on a particular cell, search space, BWP, and/or CORESET for scheduling the PCell, the WTRU may or may not deactivate PDCCH monitoring on the active cell, search space, BWP, and/or CORESET on which the PCell is scheduled. The WTRU may be triggered to initiate the control channel selection procedure.

A WTRU may switch to, activate, or deactivate PDCCH monitoring on a serving cell, BWP, search space, and/or CORESET for reception of downlink control and/or scheduling information corresponding to a particular cell (e.g. a PCell) based on at least one of the following: reception of WTRU-common signaling; reception of WTRU specific signaling; receiving a number of DL signals; activation of a particular DRX cycle; as a function of the DRX status or timers; as a function of a configured time domain pattern; upon activation or deactivation of a serving cell; upon activation of a BWP; upon detection of a beam failure; upon declaring of a radio link failure (RLF); or detection of a consistent UL LBT failure.

In an embodiment, a WTRU may switch, activate, or deactivate PDCCH monitoring on a serving cell, BWP, search space, and/or CORESET for reception of downlink control and/or scheduling information corresponding to a particular cell based on reception of WTRU-common signaling. The WTRU may monitor one or more WTRU common search spaces configured on a serving cell. The WTRU may receive information on a WTRU common search space to indicate to the WTRU to switch, activate, or deactivate PDCCH monitoring on a serving cell, BWP, search space, and/or CORESET for reception of downlink control and/or scheduling information for another serving cell. The information may be an indication and may be an explicit or implicit indication. The information may be received in a DCI. The information may be from a property of scheduling information. The WTRU may revert to monitoring a specific cell (e.g. PCell) upon determination that a certain amount of time has elapsed. The WTRU may start or restart a timer upon reception of the information. Upon expiration of the timer, the WTRU may revert to monitoring a specific cell.

In an embodiment, a WTRU may switch, activate, or deactivate PDCCH monitoring on a serving cell, BWP, search space, and/or CORESET for reception of downlink control and/or scheduling information corresponding to a particular cell based on reception of WTRU-specific signaling. The WTRU may monitor one or more dedicated or WTRU-specific search spaces configured on a serving cell. The WTRU may receive information on a dedicated or WTRU-specific search space to indicate to the WTRU to switch, activate, or deactivate PDCCH monitoring on a serving cell, BWP, search space, and/or CORESET for reception of downlink control and/or scheduling information for another serving cell. The information may be an indication and may be an explicit or implicit indication. The information may be received in a DCI. The information may be from a property of scheduling information. The WTRU may revert to monitoring a specific cell (e.g. PCell) upon determination that a certain amount of time has elapsed. The WTRU may start or restart a timer upon reception of the information. Upon expiration of the timer, the WTRU may revert to monitoring a specific cell.

In an embodiment, a WTRU may switch, activate, or deactivate PDCCH monitoring on a serving cell, BWP, search space, and/or CORESET for reception of downlink control and/or scheduling information corresponding to a particular cell based on reception of a number of DL signals compared to a threshold. The DL signals may include DCIs, PDSCHs, and/or PDCCHs. The threshold may be predetermined or dynamically indicated. In an example, the WTRU may switch, activate, or deactivate PDCCH monitoring if the number of DL signals is less than or greater than a threshold. In an example, the WTRU may switch, activate, or deactivate PDCCH monitoring if the number of DL signals is less than or greater than a threshold during a particular time period.

In an embodiment, a WTRU may switch, activate, or deactivate PDCCH monitoring on a serving cell, BWP, search space, and/or CORESET for reception of downlink control and/or scheduling information corresponding to a particular cell based on activation of a DRX cycle. The WTRU may switch, activate, or deactivate PDCCH monitoring on a serving cell, BWP, search space, and/or CORESET for reception of downlink control and/or scheduling information for another serving cell after transitioning into a DRX cycle or a particular DRX cycle (e.g. short DRX or long DRX). In an example, the WTRU may monitor PDCCH on a PCell during On durations of a long DRX cycle. Upon reception of a DCI or scheduling information during a particular On duration or upon activating a short DRX cycle, the WTRU may activate PDCCH monitoring on an SCell for scheduling the PCell.

In an embodiment, a WTRU may switch, activate, or deactivate PDCCH monitoring on a serving cell, BWP, search space, and/or CORESET for reception of downlink control and/or scheduling information corresponding to a particular cell based on a function of a DRX status or timer. The WTRU may be configured or predefined to monitor PDCCH for scheduling a PCell on a particular cell, search space, BWP, and/or CORESET as a function of whether a DRX timer is running (e.g., drx-inactivity timer, drx-HARQ RTT timer, data inactivity timer, and/or drx-Retransmission timer). In an example, the WTRU may monitor the SCell for PCell scheduling if a drx-Inactivity timer is running.

In an embodiment, a WTRU may switch, activate, or deactivate PDCCH monitoring on a serving cell, BWP, search space, and/or CORESET for reception of downlink control and/or scheduling information corresponding to a particular cell based on a function of a configured time domain pattern. The WTRU may be configured with a pattern to monitor PDCCH for scheduling a PCell on a particular cell, search space, BWP, and/or CORESET as a function of time.

In an embodiment, a WTRU may switch, activate, or deactivate PDCCH monitoring on a serving cell, BWP, search space, and/or CORESET for reception of downlink control and/or scheduling information corresponding to a particular cell based on an activation or deactivation of a serving cell. A WTRU may start or stop monitoring PDCCH resources associated with scheduling a particular cell upon its activation or deactivation (e.g., after reception of a deactivation or activation of a MAC CE or expiration of an SCell deactivation timer). The WTRU may stop monitoring PDCCH resources associated with scheduling a PCell if the cell on which the PDCCH resources are in is deactivated. The WTRU may start monitoring PDCCH on a different SCell for scheduling a PCell or the PCell itself.

In an embodiment, a WTRU may switch, activate, or deactivate PDCCH monitoring on a serving cell, BWP, search space, and/or CORESET for reception of downlink control and/or scheduling information corresponding to a particular cell based on an activation or deactivation of a BWP. The WTRU may start or stop monitoring PDCCH resources associated with scheduling a particular cell upon activation or deactivation of a BWP in that cell (e.g. after reception of a (de)activation BWP switch command or expiration of a BWP inactivity timer). The WTRU may stop monitoring PDCCH resources associated with scheduling a PCell if the SCell BWP on which the PDCCH resources are in is deactivated. The WTRU may start monitoring PDCCH on a different SCell BWP for scheduling the PCell (e.g. either the newly active BWP on the same SCell or a different BWP on a different active serving SCell) or the PCell itself. In an embodiment, the WTRU may monitor PDCCH on an SCell for PCell scheduling if the UL and/or DL active BWP on the PCell is from a configured subset of BWPs, a default BWP, an initial BWP, or a non-default BWP.

In an embodiment, a WTRU may switch, activate, or deactivate PDCCH monitoring on a serving cell, BWP, search space, and/or CORESET for reception of downlink control and/or scheduling information corresponding to a particular cell based on detection of a beam failure. The WTRU may start or stop monitoring PDCCH resources associated with scheduling a particular cell upon detection of a beam failure in the cell on which the PDCCH resources belong to or on the PCell. The WTRU may start monitoring PDCCH on a different SCell for scheduling the PCell, upon beam failure detection on the SCell scheduling the PCell.

In an embodiment, a WTRU may switch, activate, or deactivate PDCCH monitoring on a serving cell, BWP, search space, and/or CORESET for reception of downlink control and/or scheduling information corresponding to a particular cell based on declaring of radio link failure (RLF). A WTRU may start or stop monitoring PDCCH resources associated with scheduling a particular cell upon detection of a RLF in the cell on which the PDCCH resources belong to or on the PCell. The WTRU may start monitoring PDCCH on a different SCell for scheduling the PCell, upon declaring a RLF on the SCell scheduling the PCell.

In an embodiment, a WTRU may switch, activate, or deactivate PDCCH monitoring on a serving cell, BWP, search space, and/or CORESET for reception of downlink control and/or scheduling information corresponding to a particular cell based on detection of a consistent UL listen before talk (LBT) failure. The WTRU may start or stop monitoring PDCCH resources associated with scheduling a particular cell upon detection of a consistent UL LBT failure in the cell on which the PDCCH resources belong to or on the PCell. The WTRU may start monitoring PDCCH on a different SCell for scheduling the PCell, upon detecting a consistent UL LBT failure on the SCell scheduling the PCell.

In an embodiment, a WTRU may be configured to select which downlink control channels to monitor among the available control channels that schedule data on a PCell. A WTRU may start a control channel selection procedure after being triggered by one or more of the triggers described herein.

In an embodiment, a WTRU may select one or more CORESETs to monitor. In an example, the WTRU may select a CORESET within a PCell to monitor if the number of received DL PDSCHs within the PCell is below a configured threshold for a configured period.

In an embodiment, the WTRU may select one or more search space sets to monitor that schedule data in a PCell. In an example, the WTRU may monitor a search space set on a PCell if the SCell that schedules data on the PCell is deactivated.

In an embodiment, a WTRU may adjust parameters of a CORESET. The WTRU may adjust parameters of the CORESET based on one or more of the triggers described herein. For example, a WTRU may receive a DCI that triggers the WTRU to adjust one or more CORESET parameters. The CORESET parameter to be adjusted may be one or more of the following: frequency allocation; DM-RS scrambling sequence initialization; precoder granularity; number of consecutive symbols (i.e., the CORESET duration); or CCE-to-REG mapping.

In an embodiment, a WTRU may adjust parameters of a search space set. The WTRU may adjust parameters of the search space set based on one or more of the triggers described herein. For example, a WTRU may receive a DCI (e.g., a common DCI) that changes the monitoring pattern of a search space set. The search space set parameters to be adjusted may be one or more of the following: monitoring periodicity; monitoring pattern within a slot; duration of a monitoring pattern; number of PDCCH candidates per CCE aggregation level; or number of aggregation levels.

In an embodiment, a WTRU may be configured with a CORESET that has frequency domain resources in both a PCell and an SCell and a search space set associated with the CORESET. The search space set may have a monitoring pattern that is applicable to a combination of all PDCCH/CCE resources with the PCell and the SCell. The monitoring pattern may be configured as a time-domain pattern and/or frequency domain pattern (e.g. a matrix with rows representing CCEs of the CORESET and columns representing the symbols). A WTRU may be configured with multiple monitoring patterns for the search space set and may switch between the monitoring patterns based on one or more of the triggers described herein.

Figure 2:
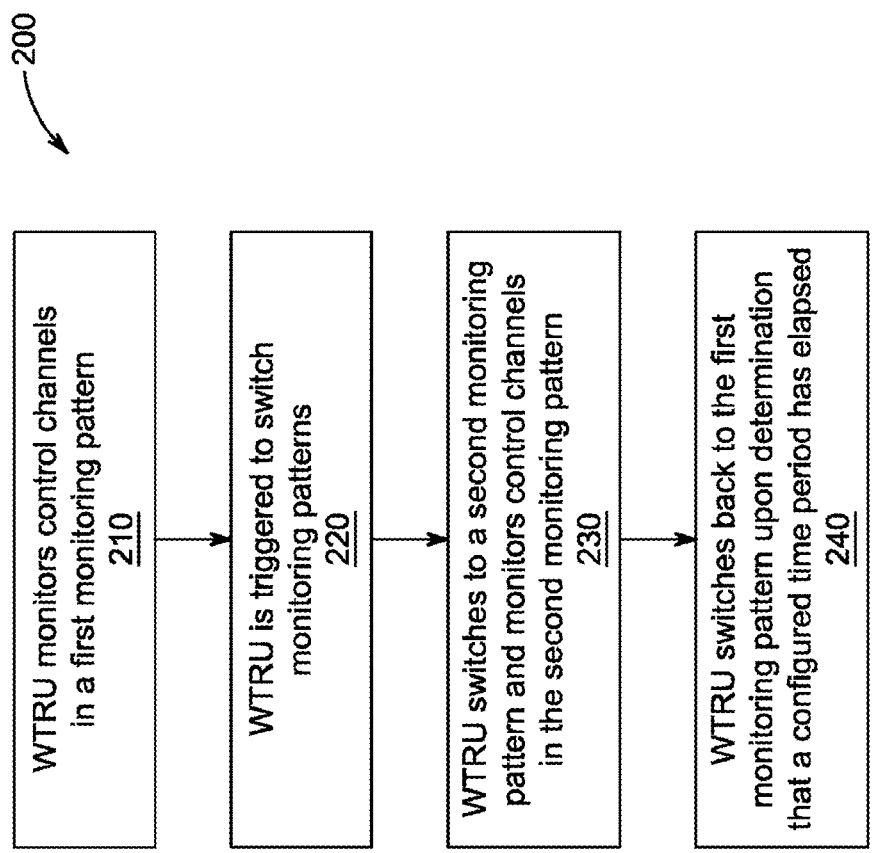
FIG. 2 shows an example method of switching between monitoring patterns.

In an embodiment, a WTRU may be configured with two search space set monitoring patterns. In an example, a first monitoring pattern may be to monitor physical resources of a search space set on both an SCell and a PCell for the first symbol within a slot and to monitor physical resources of a search space set on only the SCell in the second and third symbols of a slot. A second monitoring pattern may be to monitor physical resources of a search space set on both an SCell and a PCell for the first symbol within a slot and to monitor physical resources of the search space set on only the PCell in the second and third symbols of a slot. FIG. 2 shows a method of switching between monitoring patterns (200). A WTRU may monitor, for example as a default, control channels (e.g. PDCCHs) in a first search space set monitoring pattern (210). The WTRU may be triggered to switch monitoring patterns (220). For example the WTRU may receive a DCI on the PCell that schedules data on the PCell. The WTRU may switch to the second monitoring pattern, based on the triggering (e.g. received DCI) (230). The WTRU may use the second monitoring pattern for a configured period. The WTRU may start a timer in response to switching to the second monitoring period. The WTRU may reset the timer when a new DCI that schedules data on the PCell is detected on the PCell. Upon expiration of the timer or upon a determination that a configured time period has elapsed, the WTRU may switch back to the first monitoring pattern (240).

Figure 3:
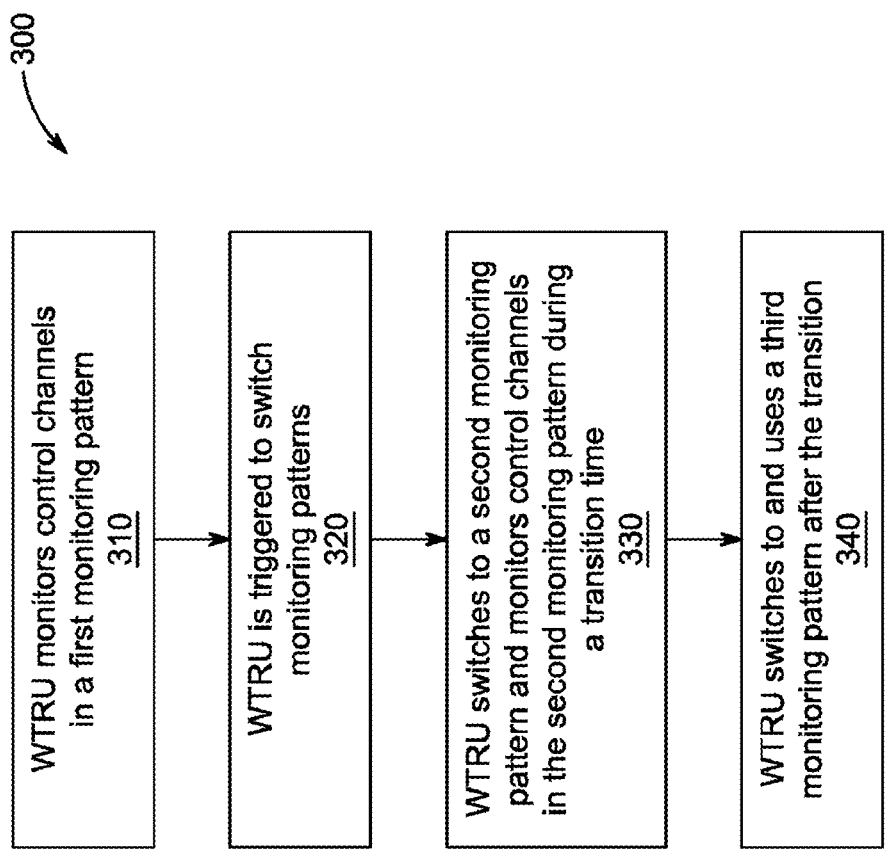
FIG. 3 shows an example method of switching between monitoring patterns.

In an embodiment, a WTRU may be configured with three monitoring patterns with one monitoring pattern that may be applied during a switching or transition time. FIG. 3 shows a method of switching monitoring patterns (300). The WTRU may monitor control channels (PDCCHs) in a first monitoring pattern (310). The first monitoring pattern may be a default monitoring pattern. The WTRU may be triggered to switch monitoring patterns (320). After being triggered to change the monitoring pattern, the WTRU may switch to and use a second monitoring pattern during a transition time (330). The WTRU may use a third monitoring pattern after transitioning (340). The pattern configuration may include flexible symbols that may be assumed during the switching or transitioning time. A WTRU may be configured, when it is triggered to switch the monitoring pattern, with the monitoring behavior during the flexible symbols. For example, a WTRU may be configured to monitor control resources on a PCell only, an SCell only, or both the SCell and the PCell, during the flexible symbols.

Figure 4:
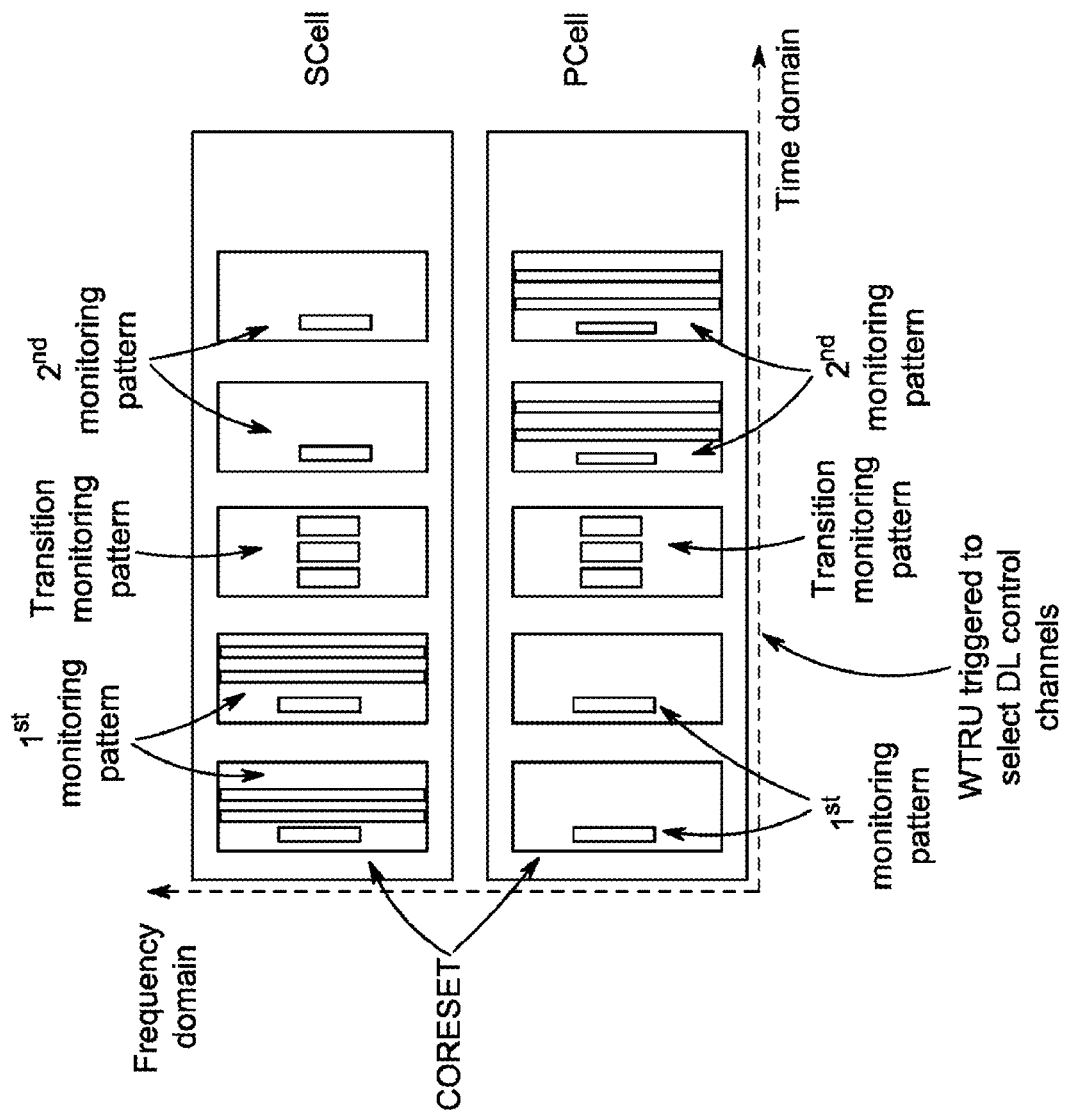
FIG. 4 shows an example of a WTRU switching between a first monitoring pattern, a transitioning time, and second monitoring pattern.

FIG. 4 shows an example of a WTRU switching between a first monitoring pattern, a transitioning time, and second monitoring pattern. The WTRU may be configured with a first monitoring pattern on an SCell and a PCell. The WTRU may monitor control channels in a first monitoring pattern in a CORESET on both the SCell and the PCell. The WTRU may be triggered to switch control channels. The WTRU may monitor control channels in a transition monitoring pattern on the SCell and the PCell. After monitoring in the transition monitoring pattern, the WTRU may monitors control channels in a second monitoring pattern on the PCell and the SCell.

In an embodiment, a WTRU may receive two DCIs in different control regions (e.g. one DCI in a PCell and another DCI in an SCell) that schedules the same data on the PCell. For example, during a transition time from one monitoring pattern to another monitoring pattern, a gNB may send a DCI on the PCell and a DCI on the SCell to schedule the WTRU on the PCell. This may increase the reliability of the control signaling during the switching time. The WTRU may prioritize among the received DCIs. The WTRU may prioritize the first received DCI. In an example, in a case of transitioning from one monitoring pattern to another, if the WTRU detects a first DCI at a particular monitoring occasion, the WTRU may stop monitoring other PDCCH candidates during the transitioning time. The WTRU may prioritize the last received DCI. For example, the WTRU may receive a first DCI in a first monitoring occasion and keep monitoring other monitoring occasions during the transition period. If the WTRU detects a second DCI, the WTRU may prioritize the second DCI. The prioritization may help the WTRU to determine which uplink control channel to use in case of performing selection of an uplink control channel.

In an embodiment, a WTRU may be configured to monitor search space sets with a number of blind decoding attempts that exceed its capability. The WTRU may prioritize, or skip, some search space sets monitoring occasions based on a configured maximum number of blind decoding per carrier. In an example, the WTRU may be configured with a maximum number of blind decoding per scheduled cell (i.e. a maximum number of blind decoding associated with all search space sets that are scheduling a cell regardless where the search space set is located).

In an embodiment, a WTRU may select an uplink control channel. A WTRU may be configured with an uplink control channel (i.e., PUCCH resources) on an SCell. In an example, the WTRU may use the uplink control channel of the SCell if the DCI that schedules data or triggers a CSI report of a PCell is received on the SCell control region. For example, the WTRU may receive a scheduling DCI on an SCell that assigns a PDSCH transmission on the PCell. After decoding the PDCSH transmission on the PCell, the WTRU may report HARQ ACK/NACK feedback on a PUCCH on the SCell. In an example, the WTRU may report HARQ ACK/NACK feedback on a PUCCH on a PCell of the scheduling DCI received on the PCell. In an example, the WTRU may be configured to send an a-periodic CSI report of the PCell on a PUCCH on the SCell if the triggering DCI is received on the SCell. In an example, the WTRU may be configured to receive an explicit bitfield within a DCI that indicates which cell to use for a PUCCH transmission.

In an embodiment, a WTRU may determine an uplink control channel to use (e.g., a PUCCH on an SCell or a PUCCH on a PCell) based on a monitoring occasion where the scheduling or triggering DCI is received. For example, the WTRU may be configured to use a PUCCH on an SCell for a HARQ feedback/a-periodic CSI report if the DCI is received during a transition period from one monitoring pattern to another monitoring pattern. The WTRU may use a PUCCH on a PCell during a transition period. A WTRU may use the last used PUCCH cell (e.g., a PUCCH on an SCell or on a PCell) before the transition period.

A WTRU may switch control channel monitoring based on radio link monitoring. In an embodiment, a WTRU may monitor one or more WTRU-specific control channels of an SCell and not monitor one or more WTRU-specific control channels on a PCell. The WTRU may determine a channel quality on the SCell and switch to monitoring WTRU-specific search space sets on the PCell if some conditions are met. In an embodiment, the WTRU may monitor control channels of the SCell and not monitor any control channels on the PCell, including common search spaces. The WTRU may determine a channel quality on the SCell and switch to monitor control channels on the PCell if some conditions are met.

Figure 5:
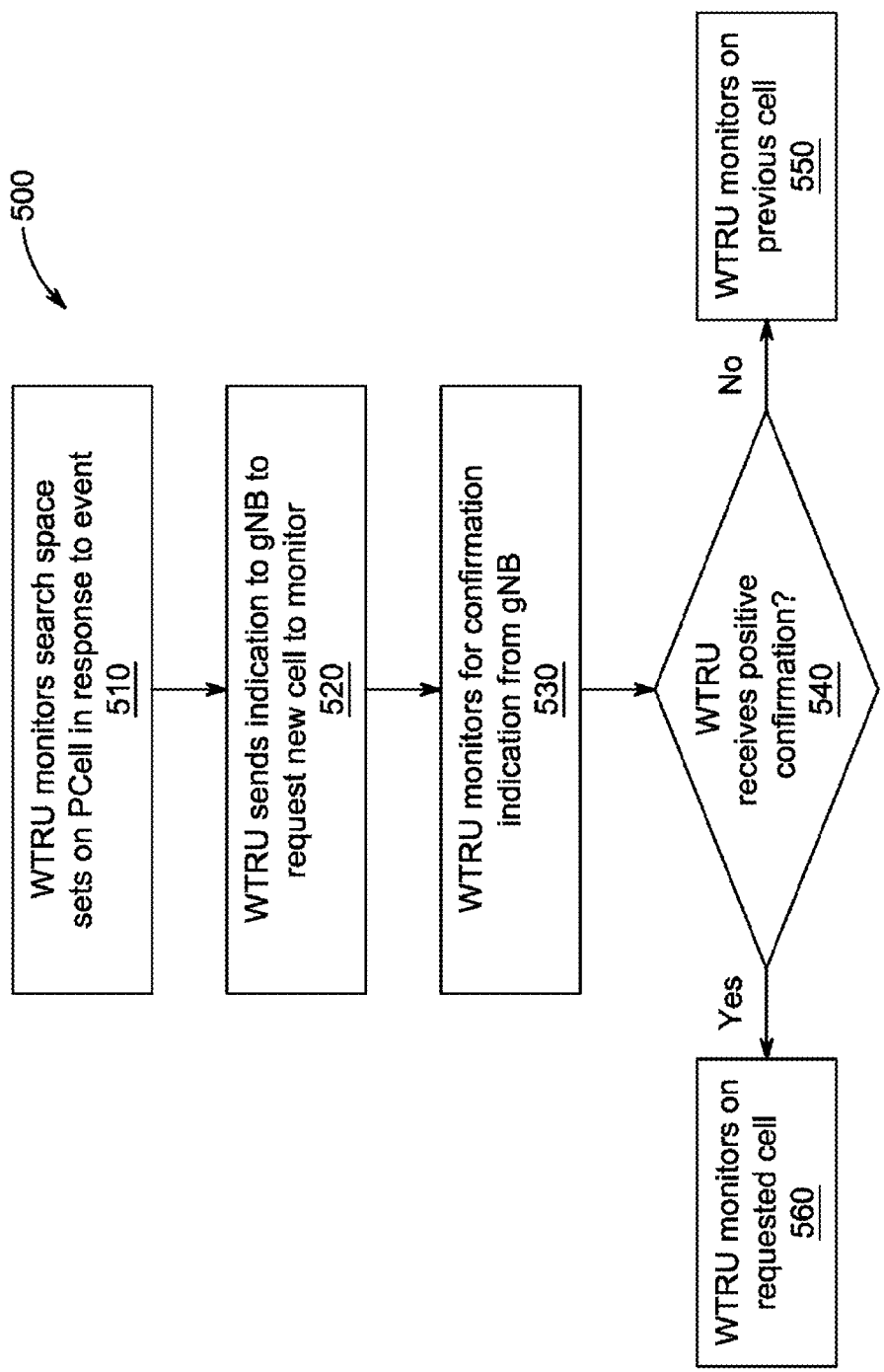
FIG. 5 shows an example method of control channel switching.

A WTRU may determine whether to monitor control channels on a PCell. FIG. 5 shows a method of control channel switching (500). In an embodiment, the WTRU may be configured with one or more search space sets on a PCell that may be monitored under certain conditions. The WTRU may monitor configured search space sets on the PCell in response to an event occurring (510).

A WTRU may start monitoring the configured search space sets on the PCell if the WTRU does not receive a DCI on an SCell that schedules downlink and/or uplink data for a PCell or SCell during a configured time. In an example, the WTRU may be configured with a timer that may be reset when a DCI that schedules data on a PCell or SCell is received. If no DCI is received and the timer expires, the WTRU may start to monitor one of the configured search space sets on the PCell. In an example, the WTRU may monitor the configured search space sets on the PCell if, after sending a scheduling request (SR) or buffer status report (BSR), no uplink grant is received. The WTRU may start a timer after sending the SR or BSR. If the timer expires and no UL grant is received, the WTRU may start monitoring the configured search space sets on the PCell.

A WTRU may start monitoring the configured search space sets on the PCell if there is an absence of a downlink HARQ feedback indication (DFI) for an uplink transmission. For example, the WTRU may monitor for HARQ DFI within a search space set within an SCell. If the WTRU fails to detect a HARQ DFI, the WTRU may start to monitor the configured search space sets on the PCell.

A WTRU may start monitoring the configured search space sets on the PCell if measurements of downlink reference signals are below a configured threshold for a configured period. Such reference signals may be on a PCell and/or an SCell, and may be configured by higher layers. For example, the WTRU may measure downlink reference signals and if a RSRP or detected energy is below a configured threshold, the WTRU may increase a counter. When the counter reaches a configured value, the WTRU may start to monitor the configured search space sets on the PCell. The WTRU may reset the counter when at least one of the measured RSRP or detected energy is above a configured threshold. The downlink reference signals may be one or more of the following: DMRS of control channels/data channels; CSI RS; SSBs; or Positioning Reference Signals (PRS).

A WTRU may start monitoring the configured search space sets on the PCell if there is a presence or absence of common signals on an SCell. For example, a WTRU may be configured with common search space sets on an SCell to monitor, for example, slot format indication, pre-emption indication, cancellation indication, or a new indication for this purpose (e.g., using a new DCI format). If the WTRU does not detect any common control message for a configured period, the WTRU may switch to monitor the configured search space set on the PCell.

A WTRU may send an indication to a gNB to indicate a preference for PDCCH monitoring on a different serving cell for scheduling the PCell. The WTRU may wait for authorization from the gNB to change the control channels. The WTRU may send the indication and switch immediately to monitor the desired control channels. The WTRU may send the indication and wait for some time period or some event and then switch to monitor the desired control channels. For example, the WTRU may switch upon expiration of a time period, or upon reception of an acknowledgment, or upon reception of a DCI indication from the gNB. This time period or event may depend on a priority of the search space/expected type of service to be scheduled.

A WTRU may send an indication to a gNB (520) to indicate: a request or preference for PDCCH monitoring on a different serving cell for scheduling the PCell, a radio link problem on the cell scheduling the PCell, and/or a notification that the WTRU has switched its PDCCH monitoring for the PCell scheduling to a different cell (possibly the PCell itself). Such indication may be provided by the WTRU by several methods described herein.

The WTRU may provide the indication by transmission of a scheduling request (SR). The WTRU may trigger a new SR and transmit the SR to the gNB to provide the indication. Such triggered SR may be transmitted by the WTRU on a subset of PUCCH resources and/or a particular SR configuration. RRC may configure the WTRU with an SR configuration that may be used and selected by the WTRU when transmitting the SR for this purpose.

The WTRU may provide the indication by transmission of an indication or uplink control information (UCI) on an uplink channel. The WTRU may include the UCI either on a PUCCH or a PUSCH to provide the indication. The number of bits may be one (i.e., used only when the WTRU prefers to fall back to PDCCH monitoring on the PCell), or may be proportional to the number of SCells applicable for scheduling the PCell (e.g., log 2(number of possible cells scheduling the PCell)).

The WTRU may provide the indication by transmission or inclusion of a MAC CE in a PUSCH. The WTRU may trigger a new MAC CE to provide the indication, which may include the SCell index experiencing radio link issues. The WTRU may trigger a new SR if it does not have an available PUSCH resource that may transmit such MAC CE. Such MAC CE may be restricted for transmission on a subset of grant types and/or a subset of serving cells (e.g., the PCell). With such restriction, the WTRU may trigger an SR even if it has a grant that does not meet grant suitability criteria. Such SR may be transmitted on a subset of PUCCH resources and/or a particular SR configuration. RRC may configure the WTRU with an SR configuration that may be used and selected by the WTRU when transmitting an SR for this purpose.

The WTRU may provide the indication by transmission of a PRACH. The WTRU may initiate a new random access (RA) procedure and transmit a preamble to a gNB to provide the indication. Such preamble may be transmitted by the WTRU on a subset of PRACH resources and may be a prioritized RACH procedure. RRC may configure the WTRU with a PRACH resources (e.g., a subset of preambles and/or RACH occasions) that may be used and selected by the WTRU when transmitting a msg 1 or a msgA for this purpose.

The WTRU may provide the indication by transmission of an SRS. The transmission may be on a configured subset of resources.

The WTRU may monitor for a confirmation indication from a gNB (530) prior to switching to monitor control channels in the PCell. In an embodiment, the WTRU may monitor for a confirmation indication from the gNB while or after switching to monitor the control channels in PCell. The WTRU may receive positive or negative confirmation of the switching request (540). If the gNB sends a negative command and/or the gNB does not respond for a configured time period, the WTRU may switch back to monitor control channels on the SCell (550). If the WTRU receives a positive confirmation of the switching request, the WTRU may switch to or continue monitoring (if it has already switched) on the requested cell.

The WTRU may be configured to receive one or more DCI carrying an explicit confirmation of the switching request. The DCI may carry a bitfield with a value indicating a positive confirmation and another value indicating negative confirmation. Such DCI may be a new format or may be reused from an existing format.

The WTRU may receive one or more DCI scheduling DL or UL data as confirmation of the switching request. For example, the WTRU may send a switching request and start monitoring both the PCell and the SCell. If the WTRU receives a DL or UL scheduling on the PCell using control channels on the PCell, the WTRU may interpret the scheduling as a confirmation of the switching request and stop monitoring control channels on the SCell. In an example, the WTRU may receive a DL or UL scheduling DCI using control channels on the SCell. The WTRU may interpret the scheduling as an indication to stop the control channel switching, and the WTRU may keep monitoring control channels on the SCell.

A WTRU may be configured to receive a trigger for an a-periodic CSI report after a configured period of requesting the control channel switch as confirmation of the switching request. For example, the WTRU may receive an aperiodic CSI report request after sending a control channel switching request. The WTRU may stop monitoring control channels on the PCell and keep monitoring the SCell for control channels. The WTRU may keep monitoring control channels on the two cells (i.e., SCell and PCell) until the WTRU receives an indication from the gNB to change the configuration. This may enable the network to receive the channel quality of the SCell before reconfiguring the downlink control channels.

A WTRU may be configured to receive an SCell activation or deactivation command as confirmation of the switching request. In an example, the WTRU may receive a DCI or a MAC CE deactivating the SCell after a configured period of sending the control channel switching request. The SCell deactivation command may be interpreted as a confirmation to monitor only control channels on the PCell. In an example, the WTRU may receive a DCI or MAC CE activating the SCell, even though the SCell may already be activated. In this case, the activation command may be interpreted as a negative confirmation of the control channel switching request.

An active BWP of scheduling cells and a scheduled cell may have the same subcarrier spacing. A maximum number of PDDCH candidates that a WTRU may process during a time slot, set of symbols, or time duration may be referred to as the maximum number of PDCCH candidates. A maximum number of number of non-overlapping CCEs that a WTRU may process during a time slot, set of symbols, or time duration may be referred to as the maximum number of non-overlapping CCEs. The maximum number of PDCCH candidates or maximum number of non-overlapping CCEs may be determined based on a WTRU capability or may be pre-defined in a specification.

In an embodiment, a WTRU may support a maximum number of PDCCH candidates or non-overlapping CCEs per scheduled cell which may be divided or distributed across the scheduling cells of a scheduled cell. For example, in a case that a PCell is scheduled by both the PCell and an SCell, a maximum number of PDCCH candidates or non-overlapping CCEs may be divided or distributed across the PCell and the SCell.

Figure 6:
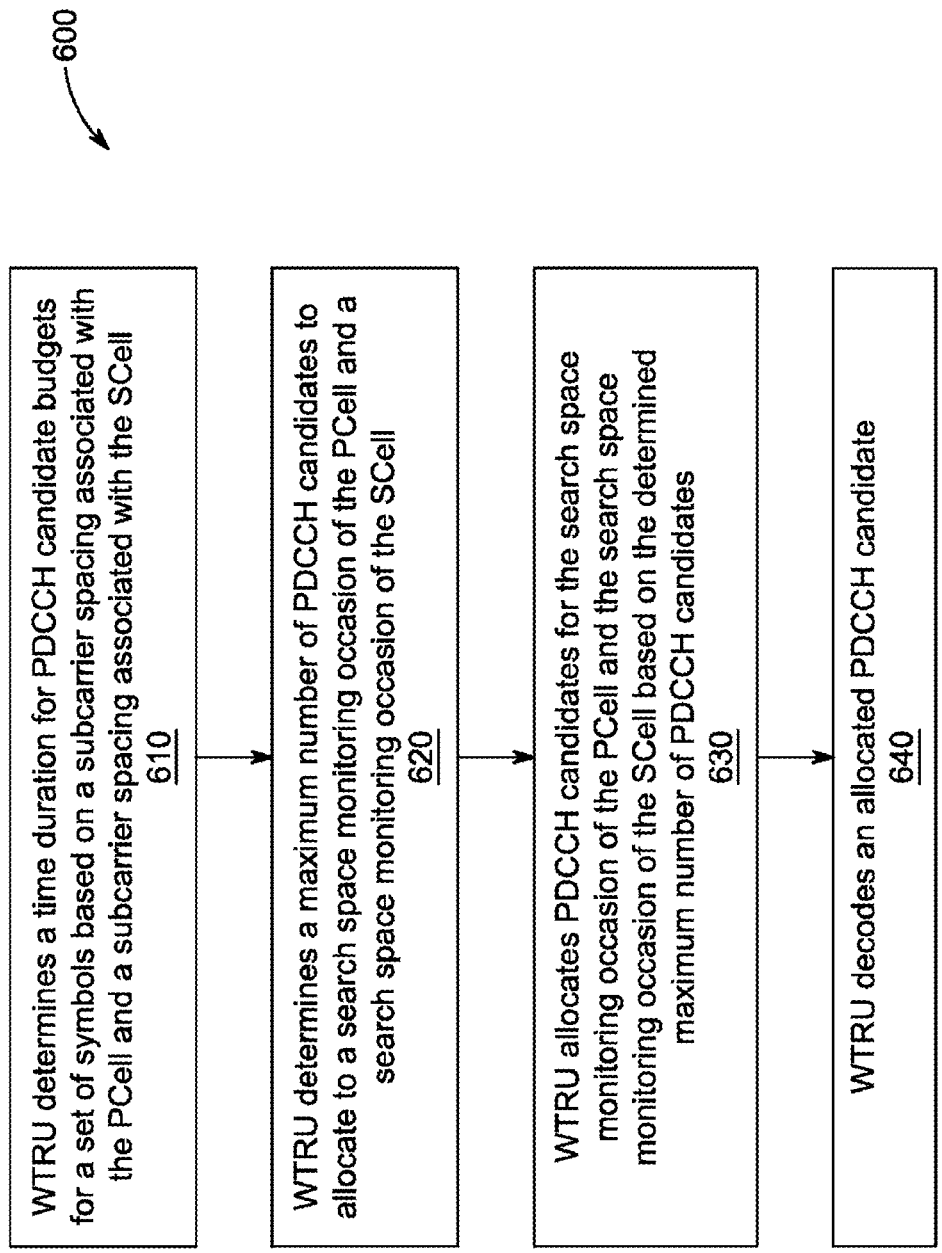
FIG. 6 shows an example method for monitoring PDCCH candidates of a PCell and an SCell for scheduling a PCell.

FIG. 6 shows an example method for monitoring PDCCH candidates of a PCell and an SCell for scheduling a PCell. A WTRU may determine a time duration for PDCCH candidate budgets for a set of symbols based on a subcarrier spacing associated with the PCell and a subcarrier spacing associated with the SCell (610). The WTRU may determine a maximum number of PDCCH candidates to allocate to a search space monitoring occasion of the PCell and a search space monitoring occasion of the SCell (620). The maximum number of PDCCH candidates are based on a per-cell ratio. The WTRU may allocate PDCCH candidates for the search space monitoring occasion of the PCell and the search space monitoring occasion of the SCell based on the determined maximum number of PDCCH candidates (630). The WTRU may decode an allocated PDCCH candidate (640).

In an embodiment, the maximum number of PDCCH candidates or non-overlapping CCEs may be distributed equally over the scheduling cells (i.e., PCell and SCell) of a scheduled cell (i.e., PCell). A WTRU may support a maximum of number of PDCCH candidates (M) and a maximum of number of non-overlapping CCE (C) for scheduling on a PCell. When the WTRU is configured with an SCell and a PCell to schedule on the PCell, the WTRU may assume a maximum number of M/2 PDCCH candidates and a maximum number of C/2 non-overlapping CCEs on the PCell and a number maximum of M/2 PDCCH candidates and a maximum number of C/2 non-overlapping CCEs on the SCell.

In an embodiment, a WTRU may be configured, using RRC signaling for example, with a portion of or fraction of the maximum number of PDCCH candidates or a fraction of the maximum number of non-overlapping CCEs to be assumed per scheduling cells of a scheduled cell. The WTRU may be configured to determine the fraction of the maximum number of PDCCH candidates or non-overlapping CCEs to be assumed per scheduling cells of a scheduled cell based on a monitoring configuration of the search space sets. At the beginning of a slot or set of symbols, the WTRU may exclude the scheduling cells that do not have a search space monitoring occasion in the slot or set of symbols for the scheduled cell.

For example, the WTRU may be configured with a first search space monitoring pattern within a PCell and a second search space monitoring pattern within an SCell for PCell scheduling. At the beginning of a slot or set of symbols, the WTRU may determine that the PCell does not have any monitoring occasions within the slot or set of symbols for PCell scheduling and may assume that the maximum number of PDCCH candidates or non-overlapping CCEs are all within the SCell. The WTRU may use the RRC configuration of the set of search spaces monitoring for scheduling on PCell to determine the maximum number of PDCCH candidates for scheduling.

The WTRU may assume that the maximum number of PDCCH candidates or non-overlapping CCEs per scheduled cell is equally distributed across the scheduling cells while it is on an RRC idle or RRC inactive mode or state.

An active BWP of scheduling cells and a scheduled cell may have the different subcarrier spacing. When the scheduled cell and the scheduling cells have different subcarrier spacing, a maximum number of PDDCH candidates and a maximum number of non-overlapping CCEs that a WTRU may process may be defined over a time duration. Such time duration may be a smallest time slot of the different subcarrier spacing (i.e., time slot of the highest subcarrier spacing). For example, if the WTRU is configured with a 15 KHz, 30 KHz and 60 KHz subcarrier spacing, the time duration may be the time slot of the 60 KHz subcarrier spacing.

In an embodiment, the maximum number of PDCCH candidates or non-overlapping CCEs per scheduled cell may be distributed equally over the scheduling cells of a scheduled cell per time duration. The maximum number of PDCCH candidates or non-overlapping CCEs may be distributed over the scheduling cells of a scheduled cell based on the sub-carrier spacing of the scheduling cells. In an example, a lower subcarrier spacing may be configured with a lower maximum number of PDCCH candidates or non-overlapping CCEs per time duration In another example, a lower subcarrier spacing may be configured with a higher maximum number of PDCCH candidates or non-overlapping CCEs per time duration.

Figure 7:
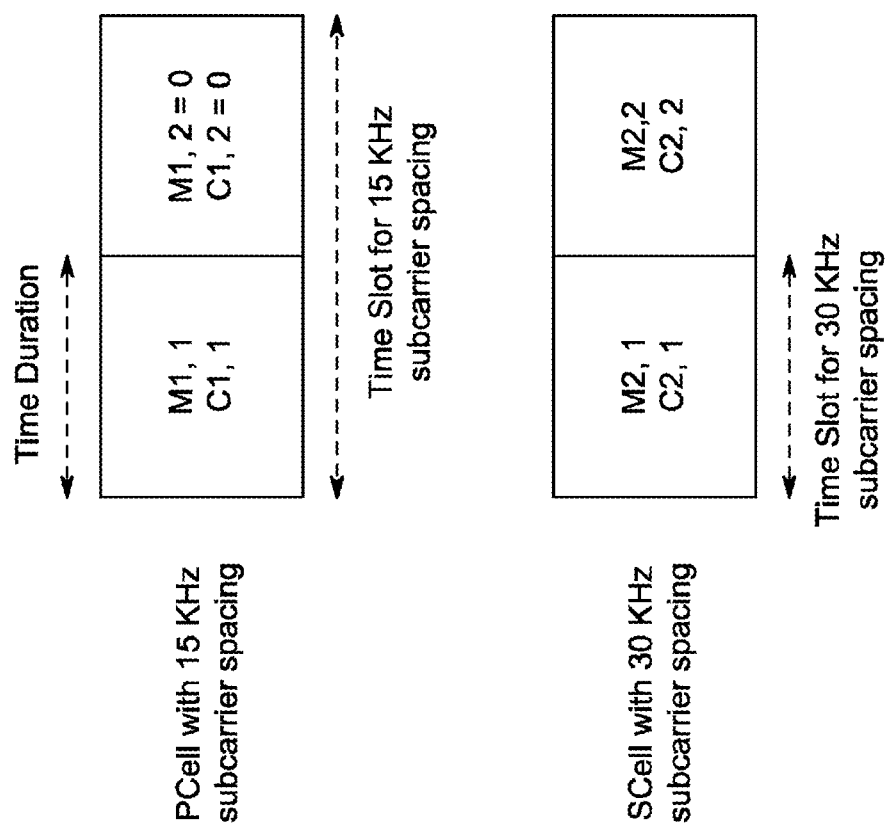
FIG. 7 is a diagram illustrating a maximum number of PDCCH BD/non-overlapping CCEs for PCell scheduling.

FIG. 7 is a diagram showing a maximum number of PDCCH blind decoding (BD) candidates (M) and maximum number of non-overlapping CCEs (C) for PCell scheduling. In FIG. 7, Mx,i indicates a maximum number of PDCCH candidates where x=1 to indicate PCell and x=2 to indicate SCell, and i indicates a time duration. As shown in FIG. 7, the PCell is configured with a 15 KHz sub-carrier spacing and is configured with M1, 1>M2,1 and C1, 1>C2, 1 per the first time duration. A maximum number of PDCCH candidates for scheduling on the PCell per a time duration is M=M1, 1+M2,1, =M2,2. A maximum number of non-overlapping CCE candidates for scheduling on the PCell per a time duration is C=C1,1+C2,1, =C2,2.

In an embodiment, the maximum number of PDCCH candidates (M) or non-overlapping CCEs (C) per scheduled cell may be distributed over the scheduling cells of a scheduled cell based on a time slot number or subframe number of the scheduling cell (i.e., M may be a function of time slot M(t) and C may be a function of time slot C(t)). The maximum number of PDCCH candidates or non-overlapping CCEs may be higher in some time slots or subframes and may be lower for some time slots or sub-frames. For example, in FIG. 7, the SCell and the PCell are scheduling cells for the PCell and the SCell is configured with a 30 KHz subcarrier spacing and the PCell is configured with a 15 KHz subcarrier spacing. During the first time slot of the SCell, the maximum number of PDCCH candidates is M2,1 and the maximum number of non-overlapping CCEs is C2,1. During the second time slot of the SCell, the maximum number of PDCCH candidates is M2,2 and the maximum number of non-overlapping CCEs is C2,2, where M2,2>M2,1 and C2,2>C2,1.

Figure 8:
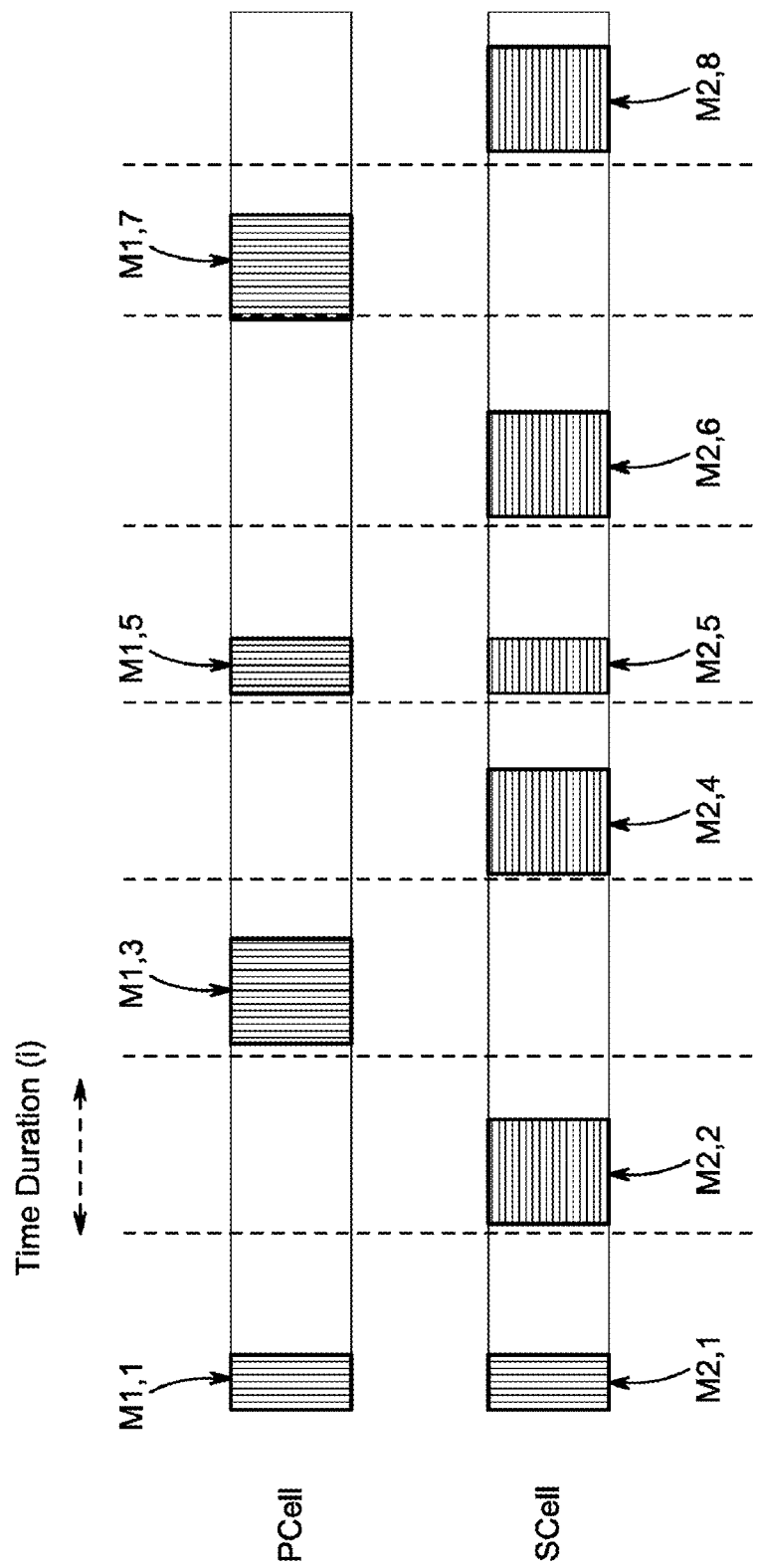
FIG. 8 is an example illustrating dynamic determination of the maximum PDCCH candidates per scheduling cell.

In an embodiment, a WTRU may be configured with a PCell and an SCell to schedule a PDSCH/PUSCH on the PCell. The WTRU may dynamically determine a maximum number of PDCCH candidates and/or non-overlapping CCEs per scheduling cell. In FIG. 8, there are eight time durations (i). At the beginning of a time duration i, the WTRU may determine the maximum number of PDCCH candidates M1, i on the PCell for PCell scheduling and the maximum number of PDCCH candidates M2,i on the SCell for PCell scheduling.

A WTRU may distribute, or allocate, a maximum number of PDCCH candidates or non-overlapping CCEs per scheduled cell across the scheduling cells of the scheduled cell. The distribution or allocation may refer to the processing power over the scheduling cells or how many PDCCH candidates may be processes per slot. The maximum number of PDCCH candidates or non-overlapping CCEs may be based on configured PDCCH candidates.

In an embodiment, a WTRU may determine that a portion of or fraction of (i.e., less than a maximum) a number of PDCCH candidates or non-overlapping CCEs per scheduled cell are allocated to scheduling cells. At the start of a time duration or time slot or set of symbols, the WTRU may determine a portion of the maximum number of PDCCH candidates or non-overlapping CCEs for a scheduling cell based on the configured number of PDCCH candidates or non-overlapping CCEs on search space sets on the scheduling cell over the total configured number of PDCCH/non-overlapping CCEs for the scheduled cell. For example, a WTRU may be configured with a PCell and an SCell to schedule a PDSCH/PUSCH on the PCell. At the start of a time duration, the WTRU may be configured with N1 PDCCH candidates on the PCell for PCell scheduling and N2 PDCCH candidates on the SCell for PCell scheduling. The WTRU may determine the portion, or fraction, of the maximum number of PDCCH candidates for PCell scheduling on PCell is equal to N1/(N1+N2) and on the SCell is equal to N2/(N1+N2). The WTRU may assume a maximum number of PDCCH candidates of M×N2/(N1+N2) on the PCell and M×N1/(N1+N2) on the SCell per time duration/time slot/set of symbols, where M is the maximum number of PDCCH candidates for PCell scheduling using all scheduling cells. The WTRU may not monitor the remaining N1−M×N1/(N1+N2) candidates on the PCell and the remaining N2−M×N2/(N1+N2) candidates on the SCell. Similarly, for the number of non-overlapping CCEs, the WTRU may assume a maximum number of non-overlapping CCEs of C×K1/(K1+K2) on the PCell and C×K1/(K1+K2) on the SCell, where C is the maximum number of non-overlapping CCEs for PCell scheduling using all scheduling cells, and K1 and K2 are the configured number of non-overlapping CCEs per PCell and SCell respectively.

In an embodiment, the WTRU may be configured to determine a portion of or fraction of the maximum number of PDCCH candidates or non-overlapping CCEs for a scheduling cell based on a frequency bandwidth configured for the CORESET(s) on the scheduling cell to schedule on the scheduled cell over the total frequency bandwidth configured for all CORESETs on different scheduling cells to schedule on the scheduled cell. In an embodiment, the WTRU may determine a portion of or a fraction of the maximum number of PDCCH candidates or non-overlapping CCEs for a scheduling cell based on the frequency bandwidth of the active bandwidth part of the scheduling cell over the total frequency bandwidth of the active bandwidth parts configured to schedule on the scheduled cell.

In an embodiment, a WTRU may assume a maximum number of PDCCH candidates or non-overlapping CCEs for a scheduling cell per time duration or time slot or set of symbols to be equal to the number of PDCCH candidates/non-overlapping CCEs configured on the search space sets on the scheduling cell per time duration/time slot/set of symbols. For example, a WTRU may be configured with a PCell and an SCell to schedule a PDSCH/PUSCH on the PCell. The WTRU may be configured with a search space set on the PCell with N1 PDCCH candidates and K1 non-overlapping CCEs to schedule on the PCell. The WTRU may be configured with a search space set on the SCell with N2 PDCCH candidates and K2 non-overlapping CCEs to schedule on the PCell. The WTRU may assume a maximum number of PDCCH candidates equal to N2 on the SCell and M−N2 on the PCell per time duration/time slot/set of symbols, where M is the maximum number of PDCCH candidates for PCell scheduling using all scheduling cells. The UE may drop or not monitor N1−(M−N2) PDCCH candidates on PCell. For the non-overlapping CCEs, the WTRU may assume a maximum number of non-overlapping CCEs equal to K2 on the SCell and C−K2 on the PCell per time duration/time slot/set of symbols, where C is the maximum number of non-overlapping CCEs for PCell scheduling using all scheduling cells.

In an embodiment, for a scheduled cell, the WTRU may be configured with a set of search spaces having a total number of PDCCH candidates/total number of non-overlapping CCEs that exceeds the maximum number of PDDCH candidates/maximum number of non-overlapping CCEs per scheduled cell. The WTRU may prioritize over the configured PDCCH candidates/non-overlapping CCEs and/or search spaces and may monitor only a subset of the configured PDCCH candidates/non-overlapping CCEs and/or search spaces. In an embodiment, the WTRU may prioritize between search spaces on different scheduling cells for a scheduled cell. At the beginning of a time slot/set of symbols/time duration, the WTRU may prioritize a search space by at least a search space priority or a search space index.

Figure 9:
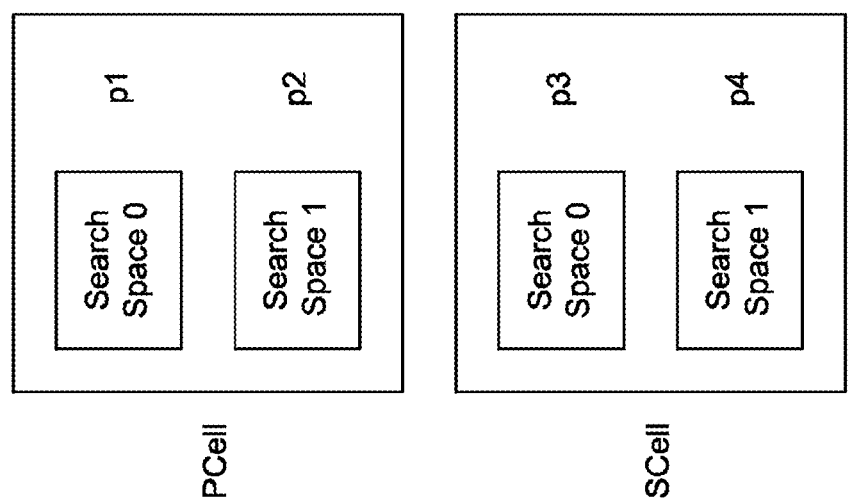
FIG. 9 illustrates an example search space prioritization using search space priority.
Figure 10:
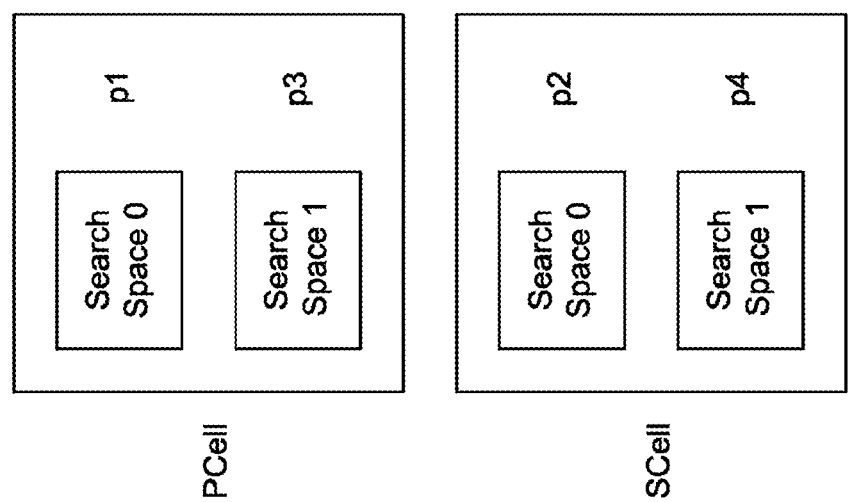
FIG. 10 illustrates an example search space prioritization using search space index.

FIGS. 9 and 10 show examples of search space prioritization based on search space priority and search space index, respectively.

In an embodiment, a WTRU may prioritize a search space based on search space priority. The set of search spaces configured across different scheduling cells to schedule a cell may be configured with a priority parameter. For example, for scheduling on a PCell, a set of search spaces may be configured on the PCell and an SCell and each search space may be associated with a priority. At the beginning of a time slot/set of symbols/time duration, the WTRU may select the search spaces in order of priority (e.g., increasing order of priority) until a maximum number of PDCCH candidates/number of non-overlapping CCEs per time slot/set of symbols/time duration is reached. The WTRU may monitor the selected search spaces. As shown in FIG. 9, the order or monitoring (p1, p2, p3, and p4) is PCell search space 0, PCell search space 1, SCell search space 0, and SCell search space 1.

In an embodiment, a WTRU may prioritize a search space based on search space index, as shown in FIG. 10. For scheduling on a PCell, a set of search spaces may be configured on the PCell and an SCell. At the beginning of a time slot/set of symbols/time duration, the WTRU may select the search spaces of the PCell in increasing order of search space index and after selecting all the search spaces within the PCell and if the maximum number of PDCCH candidates/non overlapping CCEs is not reached, the WTRU may select the search spaces of an SCell in increasing order of search space index until the maximum number of PDCCH candidates/number of non-overlapping CCEs per time slot/set of symbols/time duration is reached. The WTRU may monitor the selected search spaces. As shown in FIG. 10, the order or monitoring (p1, p2, p3, and p4) is PCell search space 0, SCell search space 0, PCell search space 1, and SCell search space 1.

In an embodiment, at the beginning of a time slot/set of symbols/time duration, the WTRU may select the search space with a lower search space index from the PCell and select the search space with a lower search space index from the SCell. If the maximum number of PDCCH candidates/non overlapping CCEs is not reached, the WTRU may select the next search space index from the PCell and the next search space index from the SCell.

For example, a WTRU may be configured with two search spaces on a PCell (i.e., search space 0 and search space 1) and two search spaces on an SCell (i.e., search space 0 and search space 1). The WTRU may select the search space 0 of the PCell and if the maximum number of PDCCH candidates/non-overlapping CCEs is not reached, then the WTRU may select search space 0 of the SCell. If the maximum number of PDCCH candidates/non-overlapping CCEs is not reached, the WTRU may selects search space 1 of the PCell. If the maximum number of PDCCH candidates/non-overlapping CCEs is not reached, the UE may select search space 1 of the SCell (as shown in FIG. 5B with p1/p2/p3/p4 is the priority of monitoring the search space).

A WTRUE may drop or not monitor some PDCCH candidates/CCEs within a search space if the search space is selected to be monitored because there are some remaining PDCCH candidate/non-overlapping CCEs that the WTRU may process, but the overall PDCCH candidates/CCEs configured for that search space will result in exceeding the maximum number of PDCCH candidates/number of non-overlapping CCEs per slot/set of symbols/time duration.

A WTRU may drop or not monitor PDCCH candidates of a certain aggregation level (AL). For example, the WTRU may be configured to not monitor higher aggregation levels such as AL=16 and AL=8. In an example, the WTRU may be configured to not monitor lower aggregation levels such as AL=1, AL=2 and AL=4. In an example, the WTRU may be configured to select the CCEs with lower indices to monitor in case the configured CCEs for a search space may result in exceeding the maximum number of PDCCH candidates/number of non-overlapping CCEs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit receive unit (WTRU) comprising a processor and memory, the processor and memory configured to:
   receive a radio resource control (RRC) message, the RRC message comprising configuration information indicating that transmissions performed using a primary cell (PCell) can be scheduled via the PCell or a secondary cell (SCell), the RRC message comprising first search space configuration information associated with the PCell and second search space configuration information associated with the SCell;
   determine a maximum number of physical downlink control channel (PDCCH) candidates to monitor in a slot for scheduling of the transmissions performed using the PCell;
   determine a maximum number of non-overlapping control channel elements (CCEs) to monitor in the slot for scheduling of transmissions performed using the PCell;
   determine that a first fraction of the maximum number of PDCCH candidates are applicable to PDCCH monitoring in the PCell for a first slot and that a second fraction of the maximum number of PDCCH candidates are applicable to PDCCH monitoring in the SCell in the first slot;
   determine that a first fraction of the maximum number of non-overlapping CCEs are applicable to PDCCH monitoring in the PCell for the first slot and that a second fraction of the maximum number of non-overlapping CCEs are applicable for PDCCH monitoring in the SCell for the first slot;
   decode a first PDCCH transmission via the SCell, the first PDCCH transmission decoded via the SCell scheduling a first physical downlink shared channel (PDSCH) transmission received via the PCell;
   receive a medium access control (MAC) control element (CE) that indicates deactivation of the SCell;
   determine the maximum number of PDCCH candidates are applicable to PDCCH monitoring in the PCell in a second slot for scheduling of the transmissions performed using the PCell based on the SCell being deactivated in the second slot;
   determine the maximum number of non-overlapping CCEs are applicable to PDCCH monitoring in the PCell in the second slot based on the SCell being deactivated in the second slot;
   decode a second PDCCH transmission via the PCell, the second PDCCH transmission decoded via the PCell scheduling a second PDSCH transmission received via the PCell; and
   receive downlink control information (DCI), wherein the DCI comprises a bitfield that indicates which cell to use for a physical uplink control channel (PUCCH) transmission.

2. The WTRU of claim 1, wherein the processor and memory are configured to:
   monitor the PCell using the first fraction of the maximum number of PDCCH candidates applicable to PDCCH monitoring in the PCell; and
   monitor the SCell using the second fraction of the maximum number of PDCCH candidates applicable to PDCCH monitoring in the SCell.

3. The WTRU of claim 1, wherein the processor and memory are configured to:
   send a hybrid automatic repeat request (HARQ) acknowledgement (ACK)/negative ACK (NACK) feedback report.

4. The WTRU of claim 1, wherein the processor and memory are configured to:
   reserve or dedicate a set of search space indices of a scheduling cell to schedule on a scheduled cell.

5. The WTRU of claim 1, wherein the configuration information indicates the first fraction of the maximum number of PDCCH candidates that are applicable to PDCCH monitoring in the PCell.

6. The WTRU of claim 5, wherein the configuration information indicates the first fraction of the maximum number of non-overlapping CCEs are applicable to PDCCH monitoring in the PCell.

7. The WTRU of claim 1, wherein the processor and memory are configured to:
   select search spaces in increasing order of priority until the maximum number of PDCCH candidates is reached.

8. A method implemented by a wireless transmit receive unit (WTRU), the method comprising:
   receiving a radio resource control (RRC) message, the RRC message comprising configuration information indicating that transmissions performed using a primary cell (PCell) can be scheduled via the PCell or a secondary cell (SCell), the RRC message comprising first search space configuration information associated with the PCell and second search space configuration information associated with the SCell;
   determining a maximum number of physical downlink control channel (PDCCH) candidates to monitor in a slot for scheduling of the transmissions performed using the PCell;

determining a maximum number of non-overlapping control channel elements (CCEs) to monitor in the slot for scheduling of transmissions performed using the PCell;

determining that a first fraction of the maximum number of PDCCH candidates are applicable to PDCCH monitoring in the PCell for a first slot and that a second fraction of the maximum number of PDCCH candidates are applicable to PDCCH monitoring in the SCell in the first slot;

determining that a first fraction of the maximum number of non-overlapping CCEs are applicable to PDCCH monitoring in the PCell for the first slot and that a second fraction of the maximum number of non-overlapping CCEs are applicable for PDCCH monitoring in the SCell for the first slot;

decoding a first PDCCH transmission via the SCell, the first PDCCH transmission decoded via the SCell scheduling a first physical downlink shared channel (PDSCH) transmission received via the PCell;

receiving a medium access control (MAC) control element (CE) that indicates deactivation of the SCell;

determining the maximum number of PDCCH candidates are applicable to PDCCH monitoring in the PCell in a second slot for scheduling of the transmissions performed using the PCell based on the SCell being deactivated in the second slot;

determining the maximum number of non-overlapping CCEs are applicable to PDCCH monitoring in the PCell in the second slot based on the SCell being deactivated in the second slot;

decoding a second PDCCH transmission via the PCell, the second PDCCH transmission decoded via the PCell scheduling a second PDSCH transmission received via the PCell; and receiving downlink control information (DCI), wherein the DCI comprises a bitfield that indicates which cell to use for a physical uplink control channel (PUCCH) transmission.

9. The method of claim 8, further comprising:

monitoring the PCell using the first fraction of the maximum number of PDCCH candidates applicable to PDCCH monitoring in the PCell; and monitoring the SCell using the second fraction of the maximum number of PDCCH candidates applicable to PDCCH monitoring in the SCell.

10. The method of claim 8, further comprising:

sending a hybrid automatic repeat request (HARQ) acknowledgement (ACK)/negative ACK (NACK) feedback report.

11. The method of claim 8, further comprising:

reserving or dedicating a set of search space indices of a scheduling cell to schedule on a scheduled cell.

12. The method of claim 8, wherein the configuration information indicates the first fraction of the maximum number of PDCCH candidates that are applicable to PDCCH monitoring in the PCell.

13. The method of claim 12, wherein the configuration information indicates the first fraction of the maximum number of non-overlapping CCEs are applicable to PDCCH monitoring in the PCell.

14. The method of claim 8, further comprising:

selecting search spaces in increasing order of priority until the maximum number of PDCCH candidates is reached.

* * * * *